No. 771,954. PATENTED OCT. 11, 1904.
F. J. WARREN.
STREET PAVEMENT OR ROADWAY.
APPLICATION FILED JUNE 21, 1902.
NO MODEL.
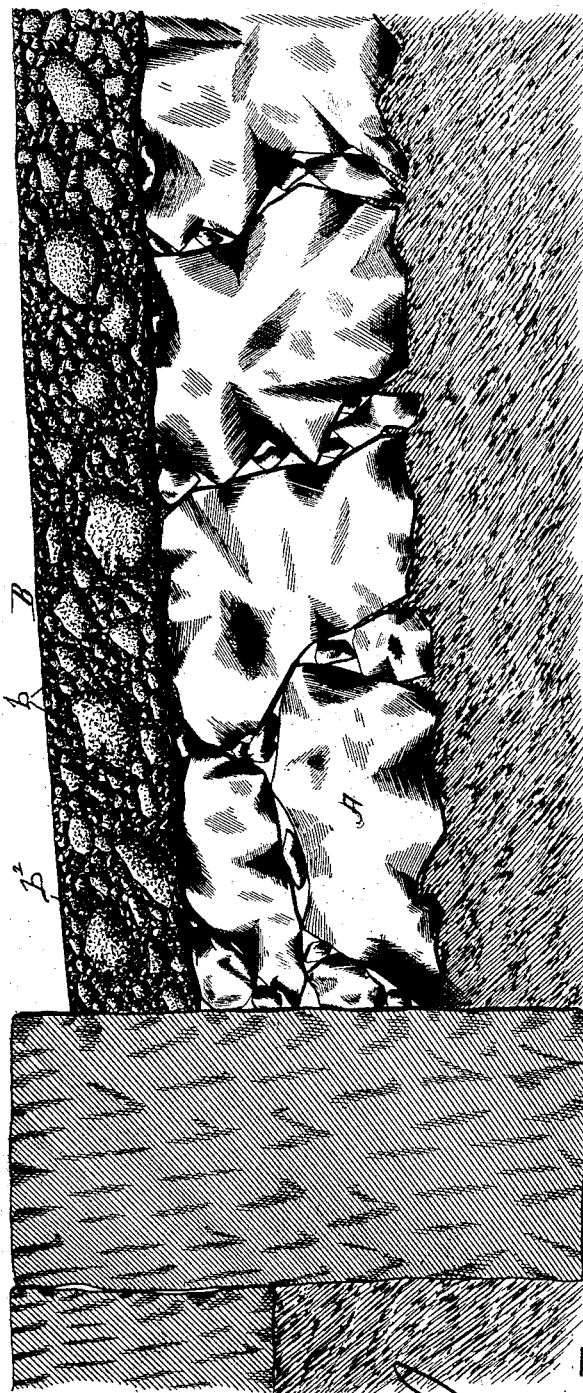
WITNESSES: INVENTOR=

No. 771,954. Patented October 11, 1904.

UNITED STATES PATENT OFFICE.

FREDERICK J. WARREN, OF NEWTON, MASSACHUSETTS.

STREET PAVEMENT OR ROADWAY.

SPECIFICATION forming part of Letters Patent No. 771,954, dated October 11, 1904.

Application filed June 21, 1902. Serial No. 112,715. (No model.)

*To all whom it may concern:*

Be it known that I, FREDERICK J. WARREN, a citizen of the United States, and a resident of Newton, in the county of Middlesex and State of Massachusetts, have invented a new and useful Improvement in Street Pavements or Roadways, of which the following is a full, clear, and exact description, reference being had to the accompanying drawing, forming a part of this specification, in explaining its nature.

The invention herein set forth is an improvement upon that described in my application for Letters Patent of the United States, executed of even date herewith, Serial No. 112,714, (Case D.) In the said application I have described ingredients or elements for the manufacture of street sheet-pavements and a pavement constructed from said ingredients which are made of an artificial mixture of sand and bituminous composition disposed to form a base or body the parts of which are adapted to be united by a bituminous uniting composition.

The present invention also consists in a pavement consisting of a base made of artificial ingredients, which ingredients are combined and united together by a bituminous composition. The ingredients consist of a mixture of sand and hydraulic cement intimately combined and preferably consolidated under hydraulic or other heavy pressure.

In practicing the invention I take about one to ten parts of sand and about one part of hydraulic cement and mix them thoroughly together and then subject them to pressure, whereby they are converted into a densely compacted solid body or mass, which may be broken into ingredients of varying sizes suitable for a body or base of a wearing layer of a street sheet-pavement. In some instances the pressure may be dispensed with. The ingredients should, as a rule, however, be dense and very hard in order that they may resist the wear of traffic. The ingredients of this material forming the base are of suitable sizes, and the sizes are proportioned with respect to each other as may be desired. The ingredients are combined together in the wearing layer by means of a bituminous composition which unites them and fills the voids between them, and I prefer that they be associated together upon the subfoundation by means of suitable pressure. The size of the particles or atoms of sand may vary to any reasonable degree and may be as large as what is sometimes called "gravel." The division-line between sand and gravel is not accurately defined, and I would not wish to be understood as meaning by the use of "sand" not to include gravel suitable for the purpose. It is not necessary that the atoms should be of the same size, as small atoms (more properly sand) may be used with large atoms, which may be more properly gravel.

I will now describe the invention in conjunction with the drawing forming a part of this specification, wherein the figure shows a portion of a street sheet-pavement having the features of my invention in cross vertical section.

Referring to the drawing, A represents the subfoundation; B, the wearing-section; *b*, the formed ingredients which comprise the base or body, and *b'* the uniting bituminous composition or cement.

Having thus fully described my invention, I claim and desire to secure by Letters Patent of the United States—

1. The elements for forming the base of a bituminous wearing-section of a street sheet pavement or roadway, composed of artificially combined and compressed ingredients of varying sizes consisting of sand and hydraulic cement.

2. The wearing-section of a street sheet-pavement, particles of a crushed or broken artificial combination of sand and hydraulic cement forming the mineral or wearing ingredients thereof, and a bituminous composition uniting said ingredients and filling the voids between them.

3. The wearing-section of a street sheet-pavement, particles of a crushed or broken artificial combination of sand and hydraulic cement forming the mineral or wearing ingredients thereof, and a bituminous composition uniting said ingredients and filling the voids between them, the said ingredients and composition being compacted together upon a subfoundation under heavy pressure.

4. The wearing-section of a street sheet-pavement consisting of elements or ingredients adapted to form a base or body composed of an artificial combination of ingredients of varying sizes and hydraulic cement, and a bituminous composition uniting said ingredients and filling the voids between them.

FREDERICK J. WARREN.

In presence of—
  RALPH L. WARREN,
  ALBERT C. WARREN.